US008063504B2

(12) United States Patent
    Chi

(10) Patent No.: US 8,063,504 B2
(45) Date of Patent: Nov. 22, 2011

(54) SYSTEMS AND METHODS FOR POWERING CIRCUITS FOR A COMMUNICATIONS INTERFACE

(75) Inventor: Hongwu Chi, Sunnyvale, CA (US)

(73) Assignee: Analogix Semiconductor, Inc., Santa Clara, CA (US)

( * ) Notice: Subject to any disclaimer, the term of this patent is extended or adjusted under 35 U.S.C. 154(b) by 259 days.

(21) Appl. No.: 12/220,411

(22) Filed: Jul. 23, 2008
    (Under 37 CFR 1.47)

(65) Prior Publication Data

US 2009/0189442 A1    Jul. 30, 2009

Related U.S. Application Data

(63) Continuation-in-part of application No. 11/820,745, filed on Jun. 19, 2007, which is a continuation-in-part of application No. 11/800,861, filed on May 7, 2007.

(60) Provisional application No. 60/997,853, filed on Oct. 5, 2007.

(51) Int. Cl.
    *H02J 3/06* (2006.01)
(52) U.S. Cl. .......................................................... 307/1
(58) Field of Classification Search ....... 307/1; 455/402
    See application file for complete search history.

(56) References Cited

U.S. PATENT DOCUMENTS

| 3,959,772 | A | * | 5/1976 | Wakasa et al. | 340/825.63 |
| 4,476,535 | A | * | 10/1984 | Loshing et al. | 702/62 |
| 4,964,140 | A | * | 10/1990 | Yonekura | 375/257 |
| 5,281,873 | A | | 1/1994 | Seki | |
| 5,842,140 | A | | 11/1998 | Dent | |
| 5,898,297 | A | | 4/1999 | Bosnyak et al. | |
| 5,907,264 | A | | 5/1999 | Feldman | |
| 5,932,123 | A | * | 8/1999 | Marhofer et al. | 219/130.01 |
| 6,292,901 | B1 | * | 9/2001 | Lys et al. | 713/300 |
| 6,720,745 | B2 | | 4/2004 | Lys et al. | |
| 6,731,132 | B2 | | 5/2004 | Aloisi | |
| 7,127,623 | B2 | | 10/2006 | Potega | |

(Continued)

FOREIGN PATENT DOCUMENTS

EP    1318601 A2    6/2003

(Continued)

OTHER PUBLICATIONS

Adrian Freed, "Bi-directional AES/EBU Digital Audio and Remove Power," CNMAT, UC Berkeley, Berkeley, California, (undated), 1-6.

(Continued)

*Primary Examiner* — Albert W Paladini
(74) *Attorney, Agent, or Firm* — Carr & Ferrell LLP

(57) ABSTRACT

Embodiments include systems and methods of powering data communications transmitter circuitry using current sinked from biasing circuitry used to bias a transmission line between the data communications transmitter circuitry and data communications receiver circuitry. In some embodiments, the current sinked from the biasing circuitry is sourced by a power supply configured to power the data communications receiver circuitry. The current sinked from the biasing circuitry is then re-used to power the data communications transmitter circuitry. The data communications transmitter circuitry can be operated using less power overall than the prior art by re-using the current first used to bias the transmission line to power the data communications transmitter circuitry. Various embodiments include HDMI transceivers, DVI transceivers, and DisplayPort transceivers.

19 Claims, 8 Drawing Sheets

U.S. PATENT DOCUMENTS

| | | |
|---|---|---|
| 7,138,992 B2 | 11/2006 | Nakamura |
| 7,141,958 B2 | 11/2006 | Saitoh |
| 7,142,480 B2 | 11/2006 | Chamberlain |
| 7,145,541 B2 | 12/2006 | Kurokawa et al. |
| 7,149,644 B2 | 12/2006 | Kobayashi et al. |
| 7,154,761 B1 | 12/2006 | Camerlo et al. |
| 7,154,981 B2 | 12/2006 | Tokuhiro et al. |
| 7,158,003 B2 | 1/2007 | Cern et al. |
| 7,158,563 B2 | 1/2007 | Ginis et al. |
| 7,269,673 B2 | 9/2007 | Kim et al. |
| 7,446,567 B2 | 11/2008 | Otsuka et al. |
| 7,511,515 B2 * | 3/2009 | Herbold ............... 324/691 |
| 7,583,033 B2 | 9/2009 | Ikeda |
| 7,712,976 B2 | 5/2010 | Aronson et al. |
| 2003/0210074 A1 | 11/2003 | Morgan et al. |
| 2005/0007162 A1 | 1/2005 | Torres |
| 2006/0005055 A1 | 1/2006 | Potega |
| 2006/0145954 A1 | 7/2006 | Kubota et al. |
| 2006/0284649 A1 | 12/2006 | Cho et al. |
| 2006/0287763 A1 | 12/2006 | Ochi et al. |
| 2006/0291493 A1 | 12/2006 | Schley-May et al. |
| 2006/0291575 A1 | 12/2006 | Berkman et al. |
| 2007/0291938 A1 | 12/2007 | Rao et al. |
| 2008/0278122 A1 | 11/2008 | Chi |
| 2008/0278224 A1 | 11/2008 | Chi |
| 2009/0189442 A1 | 7/2009 | Chi |

FOREIGN PATENT DOCUMENTS

| | | |
|---|---|---|
| WO | 0045558 | 8/2000 |

OTHER PUBLICATIONS

Tomi Engdahl, "Get Power Out of PC RS-232 Port," Electronics Circuits Designed by Tomi Engdahl, (1997), 1-6.

Rod Elliott, "Balanced Line Driver & Receiver," Elliott Sound Products, Project 51, (1999), 1-5.

* cited by examiner

SYSTEMS AND METHODS FOR POWERING CIRCUITS FOR A COMMUNICATIONS INTERFACE

CROSS-REFERENCE TO RELATED APPLICATIONS

This application is a continuation-in-part and claims the priority benefit of U.S. patent application Ser. No. 11/820,745 entitled "Apparatus and Method for Recovery of Wasted Power from Differential Drivers" by Hongwu Chi and filed on Jun. 19, 2007, which is a continuation-in-part of U.S. patent application Ser. No. 11/800,861 entitled "Apparatus and Method for Termination Powered Differential Interface Periphery" by Hongwu Chi and filed on May 7, 2007, both of which are incorporated herein by reference. This application also claims the priority benefit of U.S. Provisional Application No. 60/997,853 entitled "Systems and Methods for Powering Circuits for a Communications Interface" by Hongwu Chi and filed on Oct. 5, 2007, which is incorporated herein by reference.

BACKGROUND

1. Field of the Invention

The present invention relates, in general, to the field of powering electronic components. In particular, the present invention relates to powering circuits for a communications interface.

2. Related Art

In a typical data communications system, a transmission line between a transmitter and a receiver is biased at an intended voltage using biasing circuitry. The biasing circuitry may be configured to draw current from a power supply to produce a voltage drop between the power supply and the transmission line. Alternately, the biasing circuitry may be configured to draw current from a power supply to produce a voltage drop between the transmission line and a ground node or power sink. The current drawn from the power supply is typically not used for another purpose in the data communications system. Power is therefore consumed by the data communications system to maintain the voltage bias.

SUMMARY

There is a need to minimize power consumption of electronic circuits such as those used in a data communications system. By minimizing power consumption of electronic circuits, energy can be conserved. In electronic circuits powered by a battery, reducing power consumption lengthens battery life. Reducing power consumption can also reduce energy expenses. Power consumption of electronic circuits such as those used in a data communications system may be minimized by a system including an electronic circuit configured to power another electronic circuit, or using a method of powering an electronic circuit using another electronic circuit.

Various embodiments of the invention enable power that is first used to establish bias conditions at a transmission line or transmission line driver circuitry to be further used to power additional electronic circuits. By using power first used to establish bias conditions for additional purposes, overall power consumption is reduced compared to the prior art.

A communications interface is provided including transmitter circuitry and a power supply configured to at least partially power the transmitter circuitry. The transmitter circuitry is configured to transmit data over a transmission line to a receiver module. The power supply is configured to use current received from the receiver module over the transmission line to at least partially power the transmitter circuitry.

An electronic circuit is provided including a current regulator and a voltage regulator. The current regulator is configured to sink a current regulated to be approximately constant. The voltage regulator includes a power output and is configured to regulate a voltage of the power output to be approximately constant. The voltage regulator is configured to receive the current sinked by the current regulator from the current regulator, and supply the current sinked by the current regulator to another electronic circuit through the power output.

An electronic circuit is provided including transmission line driver circuitry coupled with a transmission line. The transmission line is coupled with a first power supply through an impedance. The electronic circuit also includes digital data circuitry coupled with the transmission line driver circuitry and configured to transmit data over the transmission line using the transmission line driver circuitry. The digital data circuitry is configured to receive power from a second power supply. The electronic circuit further includes current regulator circuitry coupled with the transmission line driver circuitry and configured to regulate a current received from the first power supply through the transmission line driver circuitry to be approximately constant. The electronic circuit additionally includes voltage regulator circuitry coupled with the current regulator circuitry and configured to provide a second power supply having an approximately constant voltage. The second power supply supplies current received from the first power supply through the current regulator circuitry to at least the digital data circuitry.

A system for data communications is provided including data communications transmitter circuitry, biasing circuitry, and voltage regulator circuitry. The data communications transmitter circuitry is configured to transmit data via a transmission line. The biasing circuitry is configured to bias the transmission line at a bias voltage by sinking current from a first power supply. The voltage regulator circuitry is coupled with the biasing circuitry and configured to regulate an approximately constant voltage at a second power supply. The second power supply is coupled to the data communications transmitter circuitry. The voltage regulator circuitry is further configured to supply current sinked by the biasing circuitry from the first power supply to the data communications transmitter circuitry via the second power supply.

A method for powering circuits for a communications interface is provided including biasing a transmission line using biasing circuitry, sinking current from a first power supply through the biasing circuitry, and regulating a voltage of a second power supply to be approximately constant. The biasing circuitry is coupled with the transmission line and configured to draw current from the first power supply. The second power supply is configured to power circuitry for the communications interface. Current is sinked from the first power supply to be supplied to the circuitry for the communications interface via the second power supply.

FIG. .6 is a schematic diagram illustrating exemplary circuitry configured to re-use current from biasing circuitry as a second power supply.

Figure 7:
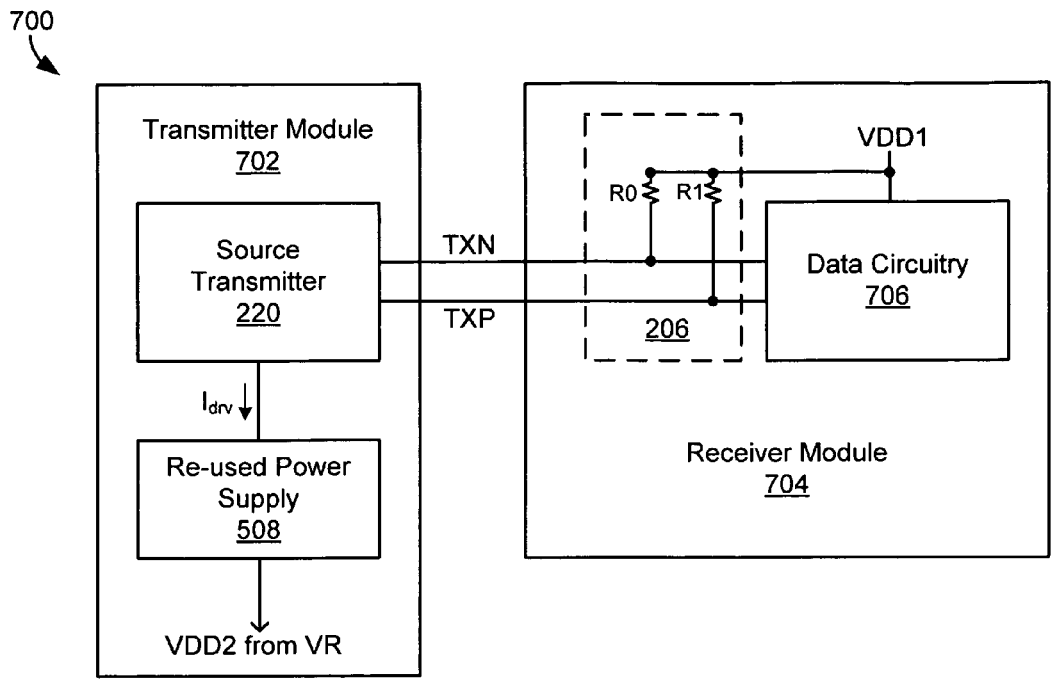

FIG. 7 is a block diagram illustrating DC-coupled communications interface circuitry configured to re-use current from transmission line biasing circuitry to power communications transmitter circuitry.

Figure 8:
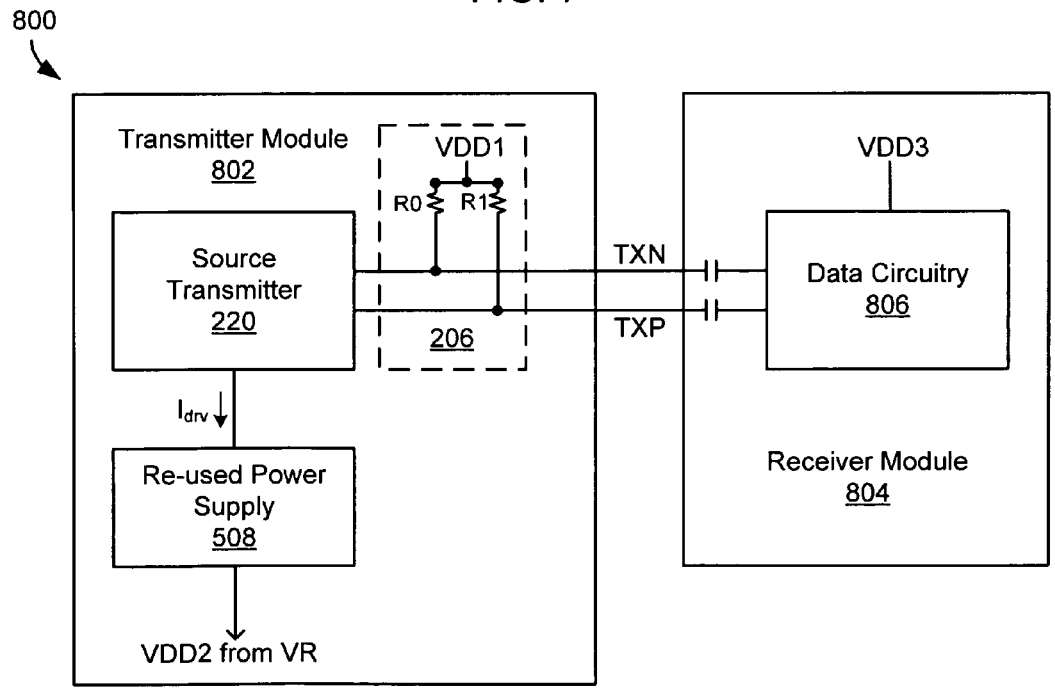

FIG. 8 is a block diagram illustrating AC-coupled communications interface circuitry configured to re-use current from transmission line biasing circuitry to power communications transmitter circuitry.

Figure 9:
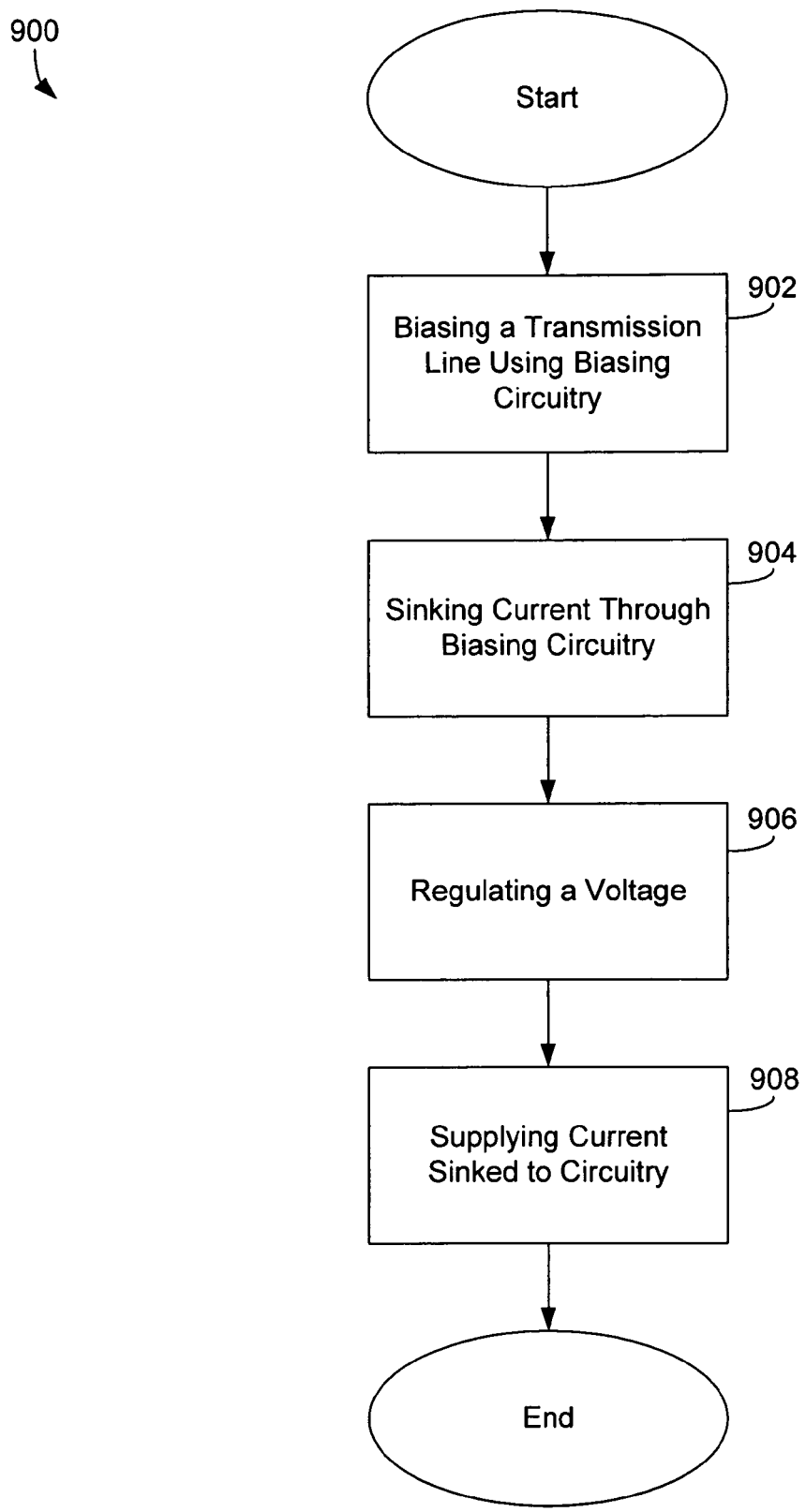

FIG. 9 is a flowchart of an exemplary method for powering circuits for a communications interface.

DETAILED DESCRIPTION

The present invention includes, in various embodiments, systems and methods of powering a data communications interface. The communications interface may be configured to communicate digital data provided at a transmitter module input port at one end of a transmission line such that the digital data is output at a receiver module output port on an opposite end of the transmission line. The digital data may be transmitted for display on a video display and/or audible reproduction via an audio amplifier. The communications interface may include electronic circuits that consume electrical power by passing electrical current through active and passive electronic devices while communicating the digital data. The communications interface may be representative of a high-definition multimedia interface (HDMI) transmission system, Digital Visual Interface (DVI) transmission system, DisplayPort transmission system, or the like. For example, a transmitter input port may be coupled with electronics within an audio/visual source such as a digital versatile disc (DVD) player, and a receiver output port may be coupled with electronics within an audio/visual display unit such as a high definition television (HDTV) set.

Various embodiments of the systems and methods described herein may be used within HDMI transceivers, DVI transceivers, and DisplayPort transceivers. The embodiments may enable these systems to have lower overall power dissipation, longer battery life, reduced cooling requirements, and smaller form factors. Lower power dissipation may become increasingly important as transmission data rates increase, as increasing data rates typically are accompanied by increasing power dissipation. For example, embodiments may be used in systems with transmission data rates equal to or greater than approximately 1 megabit per second (Mbps), 10 Mbps, 100 Mbps, 250 Mbps, 500 Mbps, 1 gigabit per second (Gbps), 1.5 Gbps, 1.62 Gbps, 1.65 Gbps, 2 Gbps, 2.2 Gbps, 2.7 Gbps, 3.4 Gbps, 4.46 Gbps, 4.95 Gbps, 10 Gbps, 10.2 Gbps, 10.8 Gbps, or greater. The digital data may be transmitted over a transmission line at least partially incorporated within a length of cable between a transmitter module and a receiver module. The length of cable may be greater than approximately 10 centimeters (cm), 90 cm, 150 cm, 250 cm, 300 cm, 500 cm, 600 cm, 750 cm, 900 cm, 10 meters (m), or 12 m.

Applications-for embodiments of the present invention may include portable electronics, including, but not limited to, cellular telephones, portable media players such as music players (e.g., MP3 players), video players (e.g., MP4 players), handheld computers and PDA's, gaming consoles, handheld electronic games, and portable memory storage devices (e.g., USB thumb drives or jump drives). Electronic circuits including embodiments of the present invention may also be used within audio/visual entertainment systems such as DVD players, Blu-Ray video players, HD-DVD players, personal video recorders and digital video recorders, digital still cameras, video cameras, etc. Other devices that may include the electronic circuits may also include personal computers, laptop computers, computer networking equipment, data communications equipment, and telecommunications equipment. The embodiments may also be used in many devices not listed herein.

The data communications interface may include transmitter circuitry that is powered using current that is first used to establish a predetermined voltage, or a bias point, at a transmission line between the data communications transmitter circuitry and data communications receiver circuitry. Biasing circuitry may be used to set an appropriate operating point for the data communications transmitter circuitry and/or data communications receiver circuitry such that the data communications transmitter circuitry and/or data communications receiver circuitry operate within certain desired parameters. The biasing circuitry may also be used to establish a predetermined current through the transmission line between the data communications transmitter circuitry and the data communications receiver circuitry.

In some embodiments, current supplied to the transmitter module from the biasing circuitry is re-used to power the data communications transmitter circuitry. As a result, the data communications transmitter circuitry can be operated using less power overall than the prior art. For example, without re-using power, a transmitter module and associated circuitry may consume approximately 300 milliwatts (mW) of power while transmitting video data at a 720 p or 1080 i resolution according to an HDMI standard. On the other hand, an HDMI transmitter module including an embodiment of the present invention may dissipate less than 50 mW of power while transmitting video data at a 720 p or 1080 resolution. The HDMI transmitter including an embodiment of the present invention may dissipate less than 100 mW of power while transmitting video data at a 1080 p resolution. The HDMI transmitter may support link data rates up to 165 million pixels per second (Mpixel/sec). Lower power operation is achieved by re-using the current first used in biasing the transmission line for a second purpose, which is to provide power to the data communications transmitter circuitry.

Figure 1:
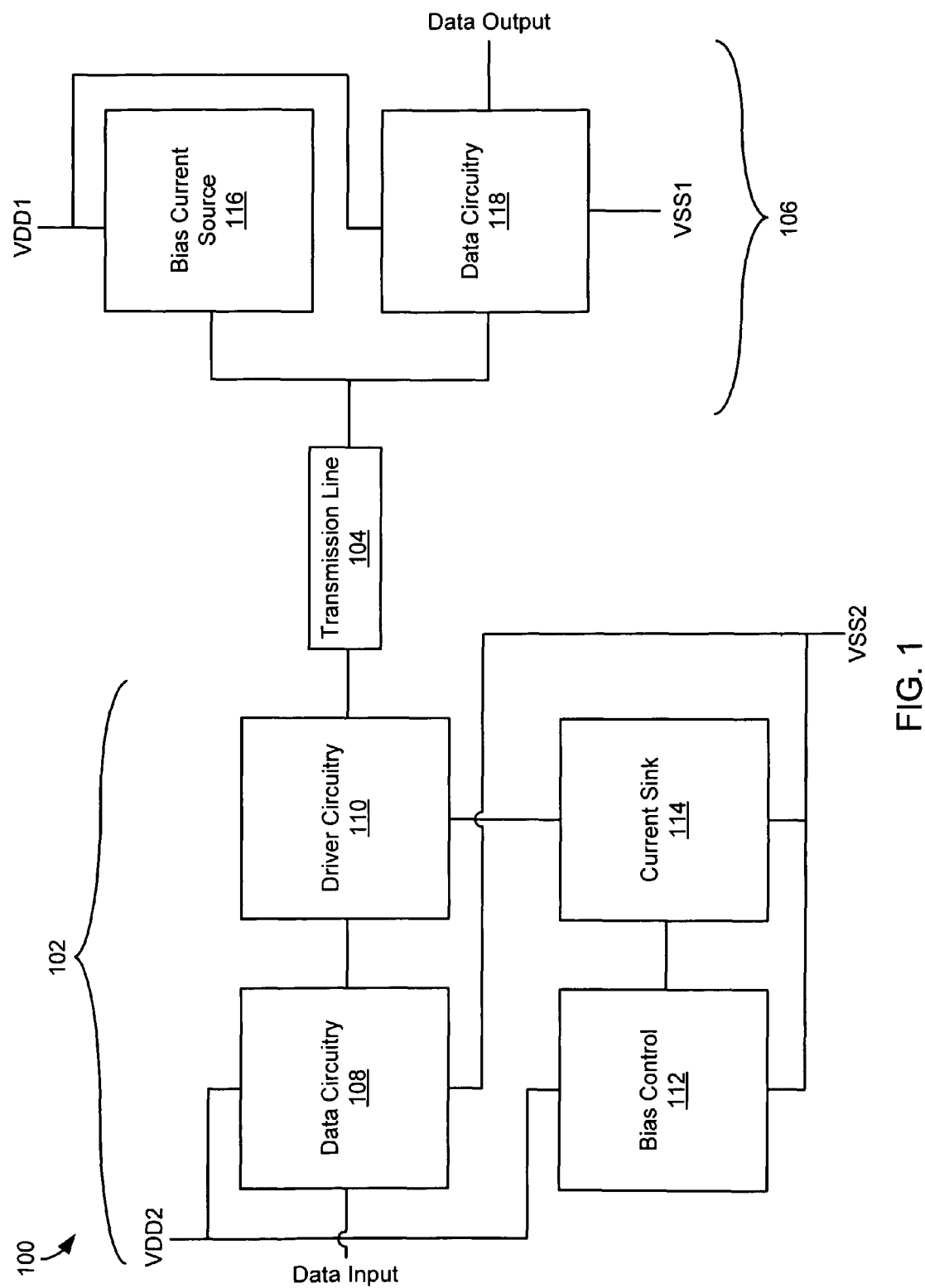
FIG. 1 is a block diagram illustrating a communications interface.

FIG. 1 is a block diagram illustrating a communications interface 100. The communications interface 100 includes a transmitter module 102, a transmission line 104, and a receiver module 106. The transmitter module 102 is configured to transmit data over the transmission line 104 to the receiver module 106. The transmitter module 102 includes data circuitry 108, driver circuitry 110, bias control 112, and current sink 114. The data circuitry 108 may be configured to accept digital data input and send corresponding data driver control signals to the driver circuitry 110. The data driver control signals may be configured to control the driver circuitry 110 to transmit data over the transmission line 104. The data to be transmitted by the driver circuitry 110 may correspond to the digital data input accepted by the data circuitry 108.

The transmitter module 102 may receive power, in the form of electrical current, from a transmitter power supply VDD2. The transmitter power supply VDD2 may be external to the transmitter module 102. Likewise, the transmitter module 102 may be coupled with a transmitter ground node VSS2, which may be external to the transmitter module 102.

The driver circuitry 110 may be configured to drive data signals across the transmission line 104. The driver circuitry 110 may include low-swing high-speed differential line drivers configured to drive data signals using drive current across the transmission line 104 according to a differential signaling protocol. The data signals driven may be based on the data driver control signals received from the data circuitry 108. The drive current may also be used to bias the transmission line 104 at a specified voltage range. The driver circuitry 110 may be configured to sink the drive current to the current sink 114. The drive current may not be used for another purpose, thereby unnecessarily dissipating power.

The bias control 112 may be configured to control the magnitude of the drive current sinked by the current sink 114 from the driver circuitry 110 to the transmitter ground node VSS2. By controlling the magnitude of the drive current sinked by the current sink 114, the bias control 112 may also control the bias conditions of the driver circuitry 110 and the transmission line 104.

The receiver module 106 includes bias current source 116 and data circuitry 118. The receiver module 106 may receive current from a bias power supply VDD1 and may also be coupled with a receiver ground node VSS1. The bias power supply VDD1 may also be known as a driver power supply. The bias current source 116 may be configured to source current from the bias power supply VDD1 to the driver circuitry 110 via the transmission line 104. The current drawn from bias power source VDD1 via the transmission line 104 may be used by the driver circuitry 110 to transmit data over the transmission line 104.

The data circuitry 118 may be configured to receive data signals from the transmission line 104. The data circuitry 118 may be configured to process the received data signals to produce data output. The data circuitry 118 may be powered by a same bias power supply VDD1 as the bias current source 116. In some embodiments, the data circuitry 118 may be DC-coupled with the driver circuitry 110 via the transmission line 104. In other embodiments, the data circuitry 118 may be AC-coupled with the driver circuitry 110 via the transmission line 104.

Figure 2:
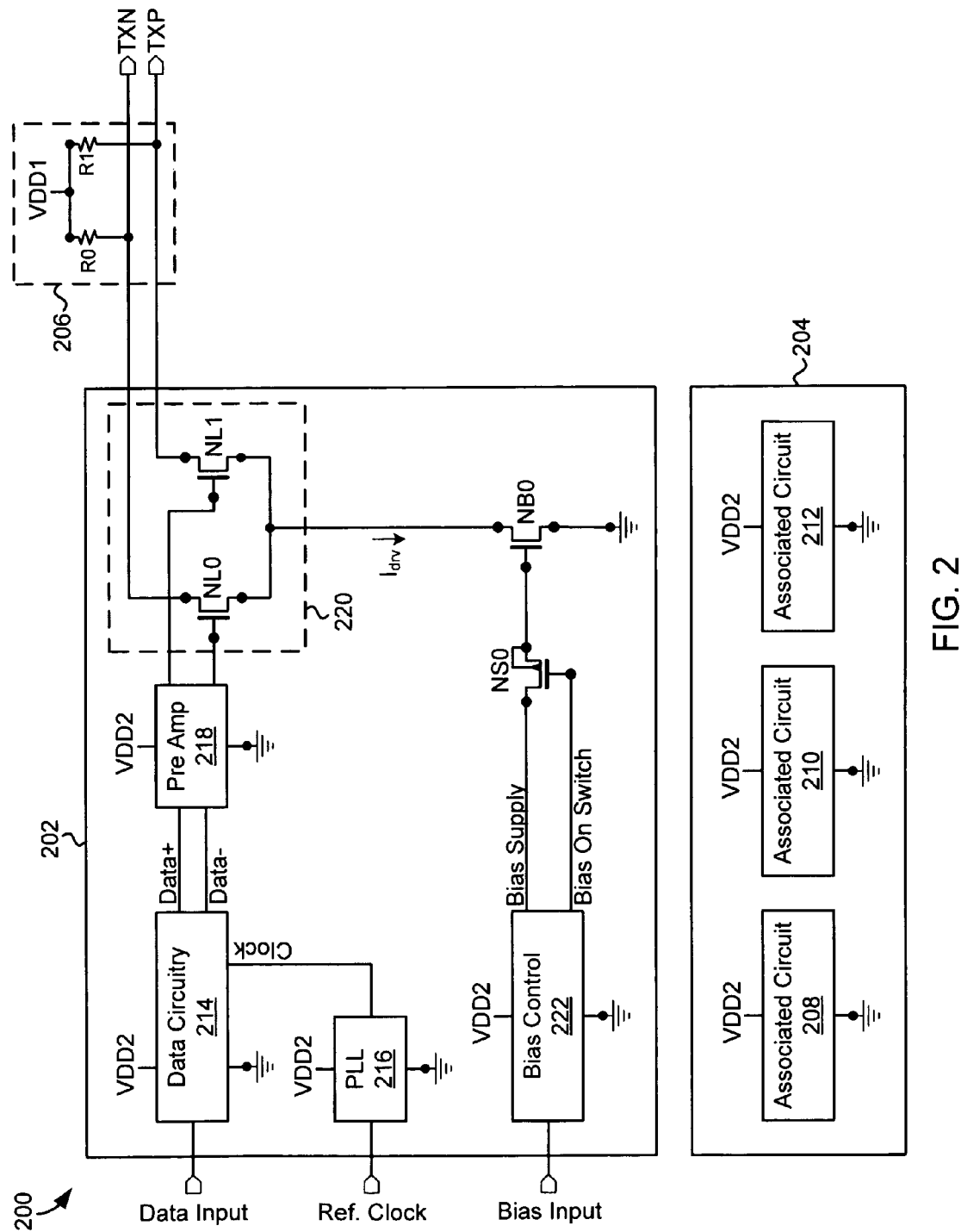
FIG. 2 is a schematic diagram illustrating communications interface circuitry.

FIG. 2 is a schematic diagram illustrating communications interface circuitry 200. The communications interface circuitry 200 includes a transmitter module 202, associated circuitry 204, and a termination load circuit 206. The transmitter module 202 is an example of the transmitter module 102, described with reference to FIG. 1. The transmitter module 202 may receive a data input signal, reference clock signal, and/or bias input signal from one or more other associated circuits such as associated circuits 208, 210, or 212. Alternatively, the data input signal, reference clock signal, and/or bias input signal may be received from one or more other circuits external to the transmitter module 202.

The associated circuitry 204. may include a variety of electronic circuits such as associated circuits 208, 210, and 212. The associated circuitry 204 may include memory, digital-to-analog converter (DAC), analog-to-digital converter (ADC), clock circuits, and so forth which may be coupled with, integrated with, or used in conjunction with the transmitter module 202. The associated circuits 208, 210, and 212 may receive current from a transmitter power supply VDD2 and be coupled with a common ground. The transmitter module 202 and the associated circuitry 204 may share the transmitter power supply VDD2 and the common ground. The transmitter power supply VDD2 may be provided by an external power source which is-not integrated with the transmitter module 202 or the associated circuitry 204. In various embodiments, the transmitter power supply VDD2 may be approximately 3.3 volts (V) or approximately 1.8 V. The common ground may be coupled with transmitter ground node VSS2, described with reference to FIG. 1.

The transmitter module 202 includes data circuitry 214, phase locked loop (PLL) 216, pre amp 218, source transmitter 220, and bias control 222. The PLL 216 and the data circuitry 214 may together be an example of the data circuitry 108, described with reference to FIG. 1. The pre amp 218 and source transmitter 220 may together be an example of the driver circuitry 110, described with reference to FIG. 1. The bias control 222 may be an example of the bias control 112, described with reference to FIG. 1.

The data circuitry 214 may be configured to read and process the data input according to a data clock signal received from the PLL 216. The PLL 216 may be configured to receive an input reference clock signal and provide the data clock signal to the data circuitry 214. The data clock signal may correspond to the input reference clock signal. In an embodiment including a differential signaling protocol, the data circuitry 214 may provide differential data signals, Data+ and Data−, to the pre amp 218. The differential data signals may correspond to the data input signal received and processed by the data circuitry 214. The differential data signals may be configured to control the pre amp 218 and source transmitter 220 to generate the corresponding data signals transmitted over the signal transmission lines TXN and TXP. Signal transmission lines TXN and TXP may be examples of the transmission line 104, described with reference to FIG. 1.

The termination load circuit 206 is an example of the bias current source 116, described with reference to FIG. 1. The termination load circuit 206 may be integrated with the transmitter module 202. Alternatively, the termination load circuit 206 may be integrated with a receiver module, such as the receiver module 106, described with reference to FIG. 1. The termination load circuit 206 may be configured to provide a bias current to the signal transmission lines TXN and TXP and the source transmitter 220. The termination load circuit 206 includes a load resistor R0 connected between the signal transmission line TXN and bias power supply VDD1. The termination load circuit 206 also includes a load resistor R1 connected between the signal transmission line TXP and bias power supply VDD1. The bias power supply VDD1 may also be referred to as a driver power supply. The bias power supply VDD1 may include a 3.3 V power supply. The bias power supply VDD1 may be associated with a receiver module, such as the receiver module 106, described with reference to FIG. 1. The bias power supply VDD1 may be provided by an external power supply which is not integrated with a transmitter module or a receiver module. In some embodiments, the bias power supply VDD1 may be the same as the transmitter power supply VDD2.

The source transmitter 220 includes differential drivers NL0 and NL1 whose sources are connected. The differential drivers NL0 and NL1 may be approximately matched to one another in their design and/or performance. The drain of differential driver NL0 is coupled with signal transmission line TXN. Likewise, the drain of differential driver NL1 is coupled with signal transmission line TXP. The differential driver NL0 may be configured to drive the signal transmission line TXN according to the Data− driving signal that is input to the gate of the differential driver NL0 from the pre amp 218. Likewise, differential driver NL1 may be configured to drive the signal transmission line TXP according to Data+ driving signal that is input to the gate of the differential driver NL1 from the pre amp 218. The transmitter module 202 may be configured such that data signals driven on signal transmission lines TXN and TXP are complementary to one another for improved performance.

The source transmitter 220 may be configured such that the differential drivers NL0 and NL1 draw current from the bias power source VDD1 through an impedance such as load resistors R0 and R1, respectively. The source transmitter 220 and the termination load circuit 206 may be configured such that a voltage on the signal transmission line TXN swings between a high voltage and a low voltage to transmit data to the receiver. A voltage on the signal transmission line TXP may swing between a low voltage and a high voltage in a complementary fashion to the voltage swing on the signal transmission line TXN. The signal swing between the high and low voltages of signal transmission lines TXN and TXP are less than the voltage difference between the bias power supply VDD1 and ground.

The transmitter module 202 may draw an approximately constant drive current $I_{drv}$ through the differential drivers NL0 and NL1 as data is transmitted over the signal transmission lines TXN and TXP. The approximately constant drive current $I_{drv}$ may then be sinked to ground by the ground connection of a bias device NB0. The bias device NB0 may control a value of the drive current $I_{drv}$ via a bias control signal received from a bias supply device NS0. The value of the drive current $I_{drv}$ may determine the bias conditions of the signal transmission lines TXN and TXP.

The bias control 222 may be configured to control the magnitude of the drive current $I_{drv}$, and consequently, the bias conditions of the source transmitter 220 and the transmission lines TXN and TXP. The bias control 222 may generate the bias supply signal and the bias on switch signal in response to the bias input signal and provide the bias supply signal and the bias on switch signal to the bias supply device NS0. In response to the bias supply signal and the bias on switch signal, the bias supply device NS0 may control the bias device NB0 which in turn controls the magnitude of the drive current $I_{drv}$ and the bias conditions of the source transmitter 220 and the transmission lines TXN and TXP.

This approximately constant drive current $I_{drv}$ consumes power. A portion of the consumed power is used to switch the differential drivers NL0 and NL1, while the majority of the rest of the power is consumed in establishing the DC bias conditions of the differential drivers NL0 and NL1. The DC bias conditions may be configured to bias the signal transmission lines TXN and TXP at or about a nominal voltage. The DC bias conditions may also be configured to establish an approximately constant drive current $I_{drv}$ throughout data transmission over the signal transmission lines TXN and TXP.

A significant amount of power is dissipated in establishing the DC bias conditions without being used for another purpose. For example, the approximately constant drive current $I_{drv}$ may be nominally between approximately 10 milliamps (mA) and 24 mA. The signal swing across the load resistors R0 and R1 may be between approximately 0.4 and 0.6 volts (V). The remaining 2.7 V of power from a 3.3 V power supply may be dissipated in establishing DC conditions of the differential drivers NL0 and NL1.

Figure 3:
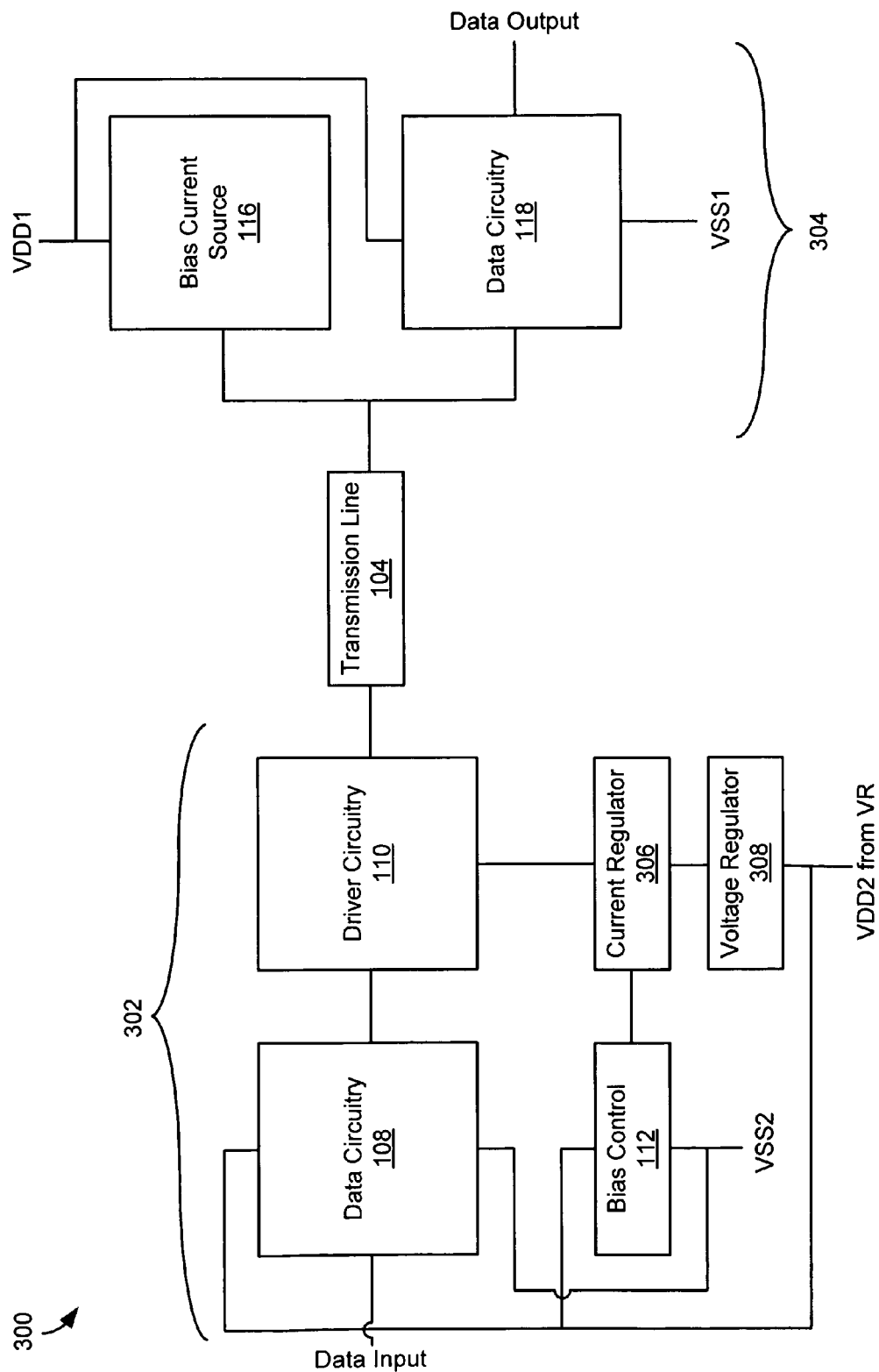
FIG. 3 is a block diagram illustrating an exemplary communications interface configured to re-use current from biasing a transmission line and/or driver circuitry to power a communications transmitter.

FIG. 3 is a block diagram illustrating an exemplary communications interface 300 configured to re-use current from biasing a transmission line and/or driver circuitry to power a communications transmitter. The communications interface 300 may be configured to accept digital data input at a transmitter module 302, transmit a representation of the digital data over the transmission line 104 to a receiver module 304, and provide corresponding digital data output at the receiver module 304. The communications interface 300 may comply with any HDMI standard such as HDMI 1.2. The communications interface 300 may also comply with any DVI standard, any DisplayPort standard, or any other video interface standard.

The communications interface 300 is similar to the communications interface 100 illustrated in FIG. 1 except that the communications interface 300 is configured to power the transmitter module 302 by re-using current from the bias power supply VDD1 provided over the transmission line 104 by the bias current source 116. To accomplish this power re-use, the current sink 114 of the communications interface 100 is replaced by a combination of a current regulator 306 and a voltage regulator 308 in the communications interface 300.

The current regulator 306 and the voltage regulator 308 may use drive current from the driver circuitry 110 to bias the transmission line 104 at an approximate bias voltage. The current regulator 306 may be configured to regulate the drive current drawn through the driver circuitry 110 to be approximately constant. The bias control 112 may be coupled with the current regulator 306 and configured to control the bias of the transmission line 104 via the current regulator 306.

The voltage regulator 308 may be coupled with the current regulator 306 and configured to receive a regulated current from the current regulator 306, regulate a voltage $V_{dd2}$ on a regulated power supply output VDD2 from VR to be approximately constant, and use the regulated current received from the current regulator 306 to provide power via the regulated power supply output VDD2 from VR. While a voltage on the bias power source VDD1 may be approximately 3.3 V, the regulated voltage on the regulated power supply output VDD2 from VR may be approximately 1.8 V. Some electronic circuits of the transmitter module 302 may be configured to be powered, at least in part, by the regulated power supply output VDD2 from VR of the voltage regulator 308.

The data circuitry 108 configured for digital data communications may be coupled with the driver circuitry 110. The data circuitry 108 may be configured to control the driver circuitry 110 to transmit data over the transmission line 104 according to digital data input. The data circuitry 118 configured for digital data communications may be coupled with the transmission line 104. The data circuitry 118 may receive data signals from the transmission line 104 and produce a data output corresponding to the transmitted data.

In some embodiments, the data circuitry 118 may be DC-coupled with the driver circuitry 110 via the transmission line 104. In other embodiments, the data circuitry 118 may be AC-coupled with the driver circuitry 110 via the transmission line 104. In some embodiments, the data circuitry 118 may be powered by a same bias power supply VDD1 as the bias current source 116.

Figure 4:
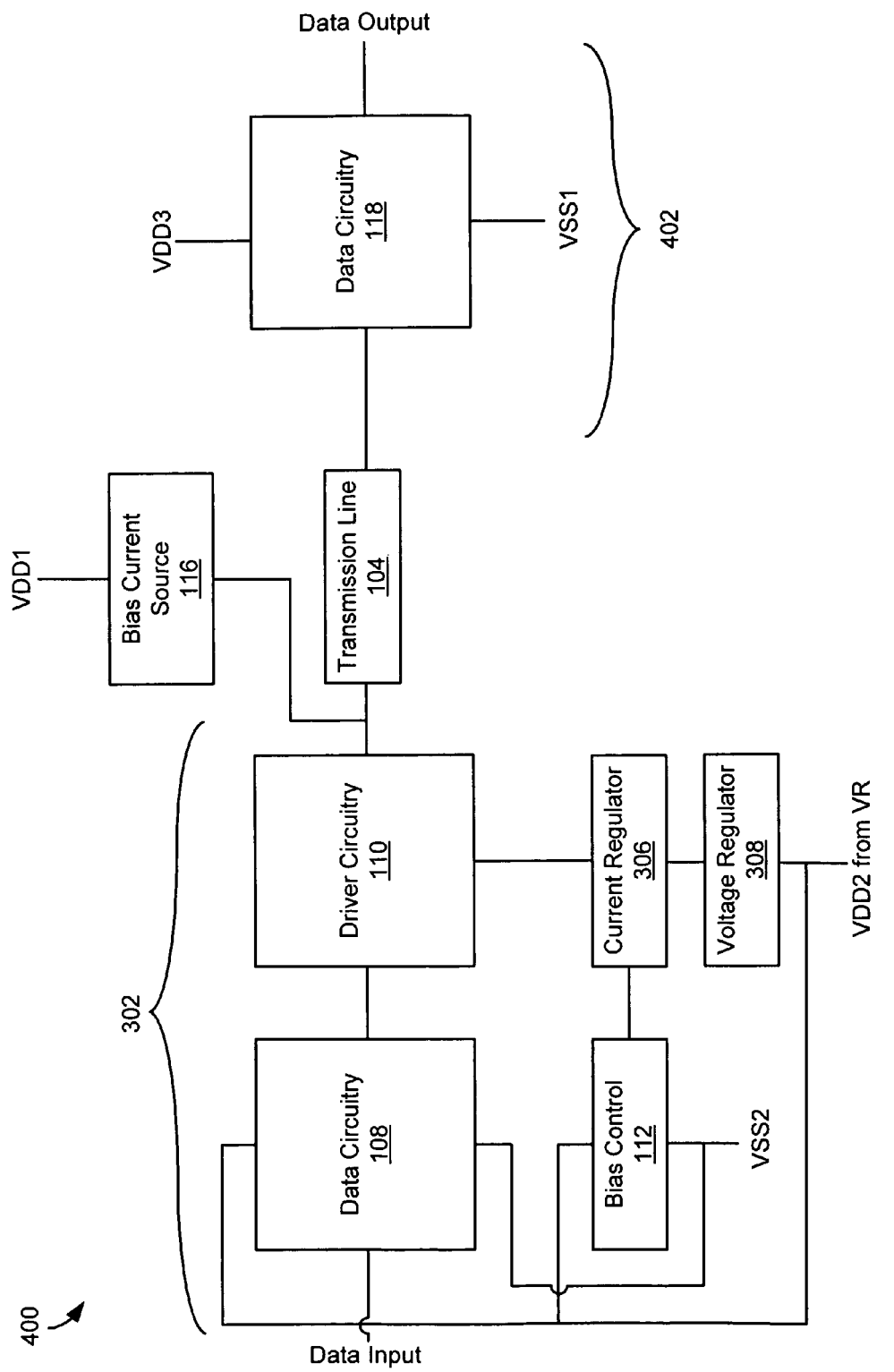
FIG. 4 is a block diagram illustrating an alternative embodiment of a communications interface configured to re-use current from biasing a transmission line and/or driver circuitry to power a communications transmitter.

FIG. 4 is a block diagram illustrating an alternative embodiment of a communications interface 400 configured to re-use current from biasing a transmission line and/or driver circuitry to power a communications transmitter. The communications interface 400 includes the transmitter module 302, the bias current source 116, the transmission line 104, and a receiver module 402. The receiver module 402 includes the data circuitry 118. The communications interface 400 is similar to the communications interface 300 illustrated in FIG. 3, except that the bias current source 116 may be coupled with the driver circuitry 110 and the transmission line 104 on the same side as the transmitter module 302, instead of on the same side as the receiver module 304, as illustrated in FIG. 3. In the communications interface 400, the bias current source 116 may be integrated with the transmitter module 302. The bias current source 116 may receive power from a bias power supply VDD1 while the data circuitry 118 may be powered by a receiver power supply VDD3. The receiver module 402 may be AC-coupled with the transmitter module 302.

Figure 5:
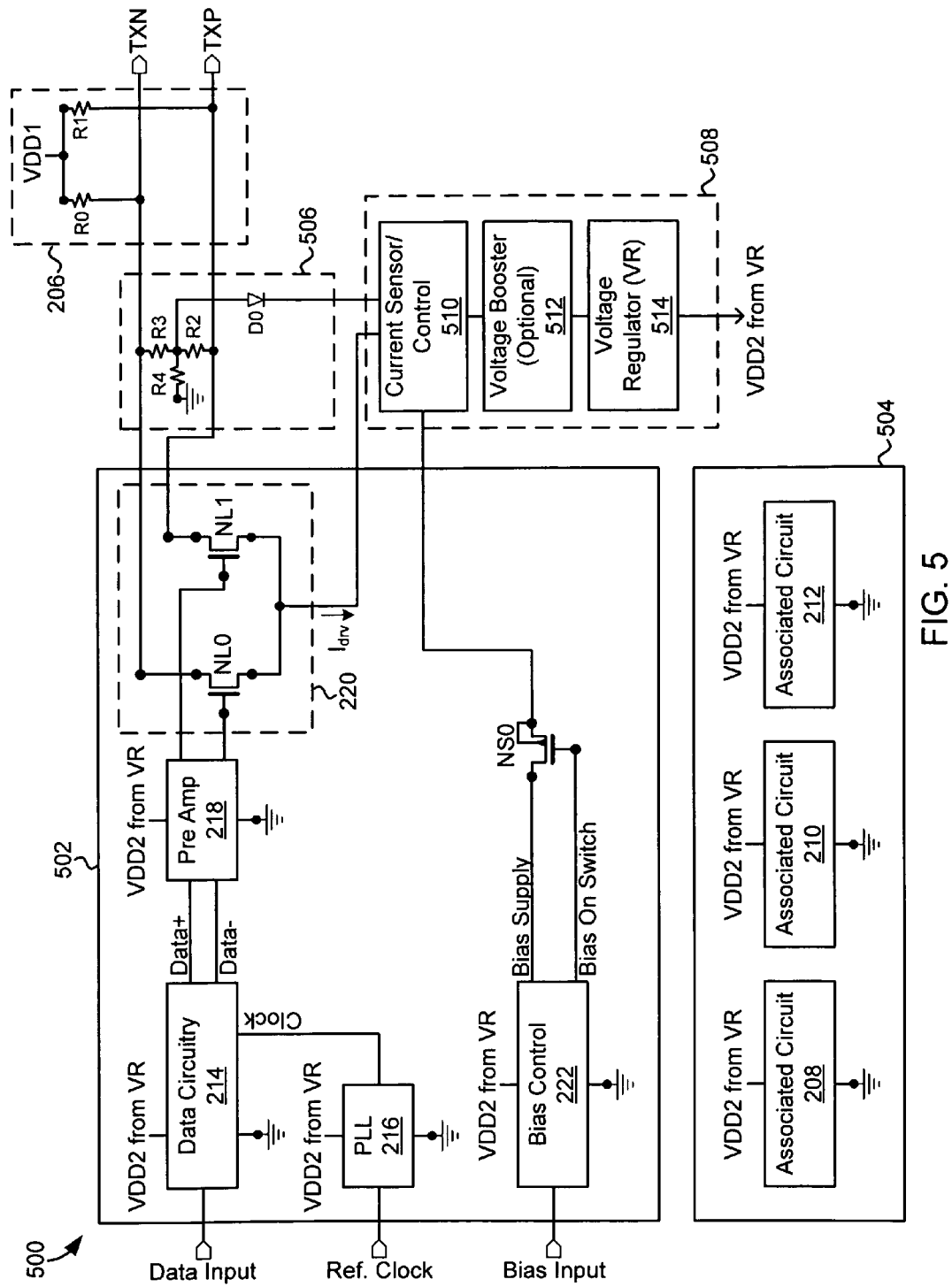
FIG. 5 is a schematic diagram illustrating communications interface circuitry configured to re-use current from transmission line biasing circuitry to power communications transmitter circuitry.

FIG. 5 is a schematic diagram illustrating communications interface circuitry 500 configured to re-use current from transmission line biasing circuitry to power communications transmitter circuitry. The communications interface circuitry 500 is an improvement over the communications interface circuitry 200, described with reference to FIG. 2. The communications interface circuitry 500 may be implemented as a system on chip (SOC) or chips on board (COB). The communications interface circuitry 500 includes a transmitter module 502, associated circuitry 504, the termination load circuit 206, a start-up circuit 506, and a re-used power supply 508. The transmission line biasing circuitry may include at least the termination load circuit 206.

The re-used power supply 508 includes a current sensor/control 510, an optional voltage booster 512, and a voltage regulator 514. The re-used power supply 508 may be configured to sink a drive current $I_{drv}$ from the source transmitter 220 into the current sensor/control 510 and provide a regulated power supply output VDD2 from VR from the voltage regulator 514. The current sensor/control 510 may include elements configured to sense and control current magnitudes according to a bias control signal received from a bias supply device NS0.

The regulated power supply output VDD2 from VR may be used to power various circuits of the transmitter module 502 and the associated circuitry 504. For example, the bias control 222, the PLL 216, the data circuitry 214, the pre amp 218, the associated circuit 208, the associated circuit 210, and the associated circuit 212 may be powered by the regulated power supply output VDD2 from VR. If the power available from the regulated power supply output VDD2 from VR is not sufficient to power all the various circuits of the transmitter module 502 and the associated circuitry 504, an additional power source may be used to supplement the regulated power supply output VDD2 from VR.

The regulated power supply output VDD2 from VR may have a voltage approximately equal to a voltage of the bias power supply VDD1 minus a voltage swing at the signal transmission lines TXN and TXP. The regulated power supply output VDD2 from VR may provide a current up to approximately the value of the drive current $I_{drv}$ from the source transmitter 220. In some embodiments, the drive current $I_{drv}$ may be in a range between approximately 10 mA and 24 mA. For embodiments where an output voltage from the regulated power supply output VDD2 from VR is required to be greater than a voltage available at the output of the current sensor/control 510, the re-used power supply 508 may include the voltage booster 512 configured to boost the output voltage to a required level above the voltage available at the output of the current sensor/control 510. For example, where the output voltage from the regulated power supply output VDD2 from VR is required to be greater than 1.8 V and the voltage available at the output of the current sensor/control 510 is only 1.8 V, the re-used power supply 508 may include the voltage booster 512 configured to boost the output voltage to a required level above 1.8 V.

The communications interface circuitry 500 may be implemented using a differential signaling protocol such as used in a DC-coupled Transmission Minimized Differential Signaling (TMDS) data link. An HDMI or DVI link may be an example of a TMDS data link. For example, four channels may be implemented in parallel (not shown), with each channel having a drive current of approximately 10 mA. The total drive current drawn from the bias power source VDD1 from the four channels may be approximately 40 mA. The bias power source VDD1 may provide a voltage of approximately 3.3 V. A voltage on the signal transmission lines TXN and TXP may be modulated by the differential drivers NL0 and NL1 to have a voltage swing of approximately 0.4 V to 0.6 V. For a four-channel communications interface circuitry configured to provide a swing of approximately 0.6 V and a current of approximately 10 mA per channel, the drive current $I_{drv}$ at the interconnected sources of differential drivers NL0 and NL1 for all four channels may provide a power source having a current of approximately 40 mA and a voltage of approximately 1.8 V. This power source may allow the drive current $I_{drv}$ to be re-used via the re-used power supply 508 to provide the regulated power supply output VDD2 from VR.

The start-up circuit 506 may be configured to provide a start-up current to the re-used power supply 508 as the communications interface circuitry 500 powers up before the source transmitter 220 provides an approximately constant drive current $I_{drv}$. Because the transmitter module 502 may be configured to receive power from the regulated power supply output VDD2 from VR, the differential drivers NL0 and NL1 may remain in an off state until after the regulated power supply output VDD2 from VR reaches a steady state operating voltage $V_{dd2}$. The start-up circuit 506 may provide the start-up current to the re-used power supply 508 when the source transmitter 220 does not provide the approximately constant drive current $I_{drv}$. The re-used power supply 508 may then use the start-up current to provide a regulated power supply output VDD2 from VR to the various circuits of the communications interface circuitry 500 that are configured to be powered by the regulated power supply output VDD2 from VR as the communications interface circuitry 500 first begins operating. The start-up circuit 506 may include a resistor R2 connected between signal transmission line TXP and a connection point, a resistor R3 connected between signal transmission line TXN and the connection point, and a resistor R4 connected between ground and the connection point. A diode D0 may be connected between the connection point and the current sensor/control 510.

In some embodiments, the termination load circuit 206 may be integrated with a receiver module (not shown), the start-up circuit 506 may be integrated with the transmitter module 502, and the transmission lines TXN and TXP may be at least partially incorporated within a cable such as an HDMI cable. In these embodiments, the transmitter module 502 may be in an unpowered state when the cable is not coupled with both the transmitter module 502 and the receiver module. When the receiver module is in a powered-up state, and the cable is first attached to couple the receiver module with the transmitter module 502, the start-up circuit 506 may be operational to power up the transmitter module 502 using power received from the receiver module over the transmission lines TXN and TXP. In other embodiments where the termination load circuit 206 is coupled with the transmitter module 502 via the transmission lines TXN and TXP, and both the termination load circuit 206 and the transmitter module 502 are in an unpowered state, the start-up circuit 506 may function in a similar manner when the termination load circuit 206 first powers up.

The start-up circuit 506 may be configured to draw a small current from the termination load circuit 206 and provide a start-up current to the current sensor/control 510. The start-up current may be relatively small compared to the steady state drive current $I_{drv}$. This start-up current may begin to be provided approximately at the same time as the signal transmission lines TXN and TXP are connected to the termination load circuit 206, or the termination load circuit 206 begins receiving power from the bias power supply VDD1. After the transmitter module 502 reaches full operational status, the signal transmission lines TXN and TXP may become biased and an approximately constant drive current $I_{drv}$ may flow from the source transmitter 220 into the re-used power supply 508. The start-up current may then no longer be needed by the re-used power supply 508 to provide the regulated power supply output VDD2 from VR, and the start-up circuit 506 may reduce the start-up current to essentially zero or a negligible value in comparison to the drive current $I_{drv}$.

Figure 6:
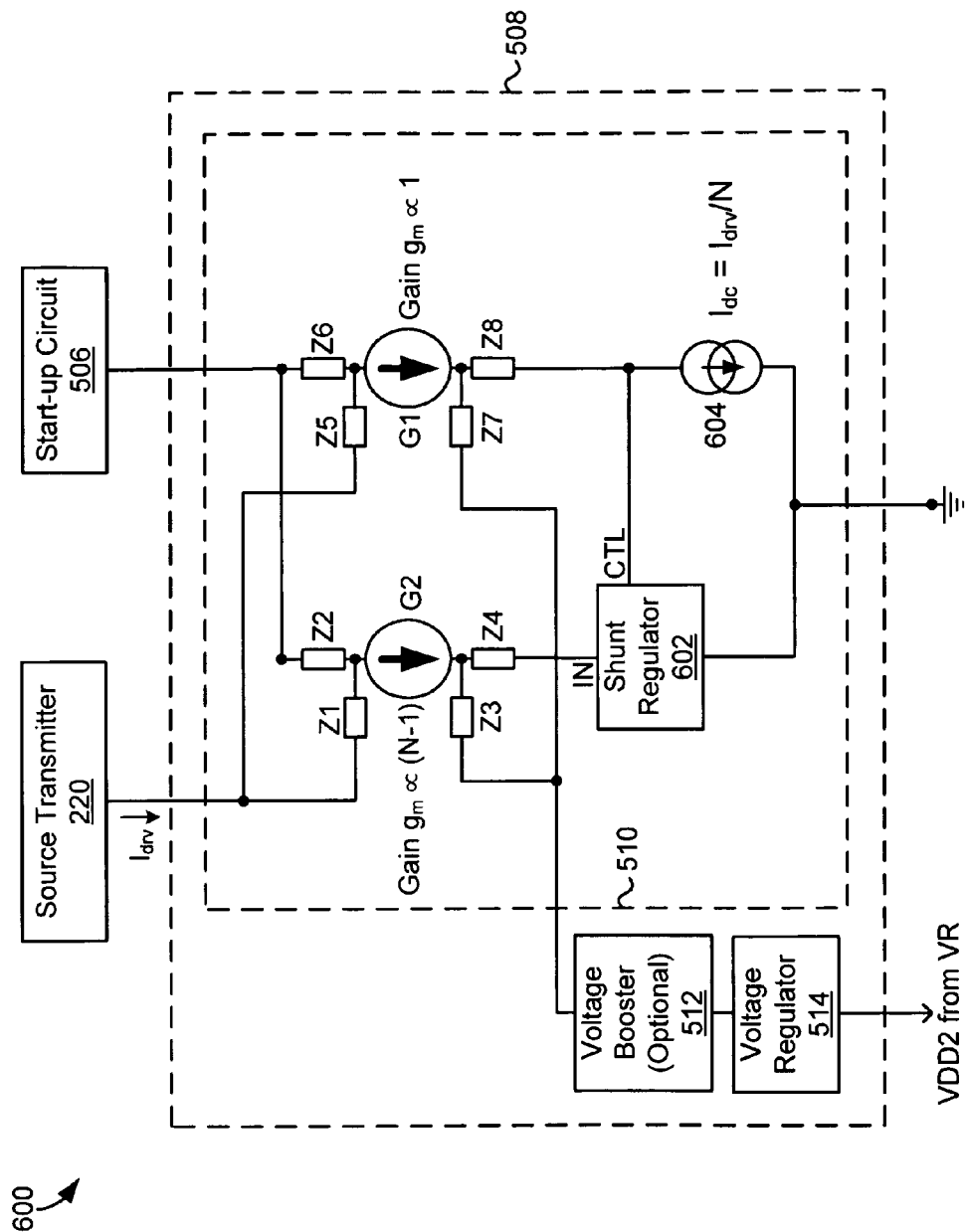

FIG. 6 is a schematic diagram illustrating exemplary circuitry 600 configured to re-use current from biasing circuitry as a second power supply. The circuitry 600 includes the source transmitter 220, the start-up circuit 506, and the re-used power supply 508. The source transmitter 220 may provide an approximately constant drive current $I_{drv}$ to the re-used power supply 508. For example, the drive current $I_{drv}$ may be approximately 10 mA for a single channel communications interface, or 40 mA for a four channel communications interface. As another example, the drive current $I_{drv}$ may be approximately 24 mA for a single channel communications interface, or 48 mA for a two channel communications interface.

The re-used power supply 508 includes voltage controlled current sources G1 and G2. Voltage controlled current sources G1 and G2 may also be configured to sense current. Voltage controlled current source G1 has a gain gm that is proportional to one (1), while voltage controlled current source G2 has a gain g. that is proportional to N−1. The gain ($g_m$) ratio provided by the pair of voltage controlled current sources G1 and G2 is therefore 1:N−1. The voltage controlled current source G1 may act as a reference current sensor and control.

A fixed current source 604 is coupled with the voltage controlled current source G1 and configured to draw a current $I_{dc}=I_{drv}/N$. A shunt regulator 602 is provided with a shunt regulator control input port coupled with the fixed current source 604 at one end. The fixed current source 604 is also coupled with the voltage controlled current source G1 at the same end. The shunt regulator control input port senses a voltage provided by the fixed current source 604 between the shunt regulator control input port and ground. The shunt regulator 602 is configured to set a voltage at a shunt regulator input port to equal the voltage at the shunt regulator control input port by shunting current from the voltage controlled current source G2 through the shunt regulator input port. The current passing through the voltage controlled current source G2 may be approximately N−1 times the reference current passing through voltage controlled current source G1. Therefore, the current passing through the voltage controlled current source G2 may be approximately (N−1)·($I_{drv}/N$). Those skilled in the art will recognize that there may be many different gains defined for voltage controlled current source G1 and voltage controlled current source G2 that will perform the intended function of various embodiments.

Voltage controlled current sources G1 and G2 may be coupled with other elements of the current sensor/control 510, the re-used power supply 508, and/or the communications interface circuitry 500 via optional impedances Z1, Z2, Z3, Z4, Z5, Z6, Z7, and Z8. Voltage controlled current sources G1 and G2 may include MOSFET or BJT devices. In some embodiments, the re-used power supply 508 may be configured with more than two voltage controlled current sources G1 and G2.

After the circuitry 600 reaches steady state and the start-up circuit 506 is no longer providing a significant start-up current, the drive current $I_{drv}$ may be approximately equal to the sum of the current passing through the voltage controlled current sources G1 and G2. The current passing through voltage controlled current source G2, which is approximately ((N−1)/N)·$I_{drv}$, may be available to be output from the current sensor/control 510 to the voltage regulator 514. The voltage regulator 514 may then regulate a voltage of the regulated power supply output VDD2 from VR. The regulated power supply output VDD2 from VR may then provide power including up to approximately ((N−1)/N)·$I_{drv}$ amps of current at the regulated voltage $V_{dd2}$ to circuitry of the transmitter module 502 and the associated circuitry 504.

In some embodiments, the voltage booster 512 may be disposed between the current sensor/control 510 and the voltage regulator 514. The voltage booster 512 may be configured to increase a voltage output from the current sensor/control 510, and consequently, the regulated voltage $V_{dd2}$ at the regulated power supply output VDD2 from VR. The voltage booster 512 may be useful to enable the re-used power supply 508 to provide the regulated voltage $V_{dd2}$ which is at a higher voltage than the voltage output from the current sensor/control 510.

FIG. 7 is a block diagram illustrating DC-coupled communications interface circuitry 700 configured to re-use current from transmission line biasing circuitry to power communications transmitter circuitry. The DC-coupled communications interface circuitry 700 includes a transmitter module 702, signal transmission lines TXN and TXP, and a receiver module 704. The transmitter module 702 may be an example of the transmitter module 502, described with reference to FIG. 5. The transmitter module 702 may include the source transmitter 220 and the re-used power supply 508. The receiver module 704 may include the termination load circuit 206 and data circuitry 706. The data circuitry 706 may be an example of the data circuitry 118, described with reference to FIG. 1. The termination load circuit 206 and the data circuitry 706 may both receive power from a bias power supply VDD1.

The source transmitter 220 may be configured to drive data signals across the signal transmission lines TXN and TXP to the data circuitry 706. The data circuitry 706 may be DC-coupled with the source transmitter 220 via the signal transmission lines TXN and TXP. The source transmitter 220 may be configured to draw a combined current equal to approximately $I_{drv}$ from the termination load circuit 206, and provide a drive current $I_{drv}$ to the re-used power supply 508. The re-used power supply 508 may be configured to provide the regulated power supply output VDD2 from VR to a variety of circuits associated with the transmitter module 702.

FIG. 8 is a block diagram illustrating AC-coupled communications interface circuitry 800 configured to re-use current from transmission line biasing circuitry to power communications transmitter circuitry. The AC-coupled communications interface circuitry 800 includes a transmitter module 802, signal transmission lines TXN and TXP, and a receiver module 804. The transmitter module 802 may be an example of the transmitter module 502, described with reference to FIG. 5. The transmitter module 802 may include the source transmitter 220, the termination load circuit 206, and the re-used power supply 508. The receiver module 804 may include data circuitry 806 configured to receive power from a receiver power supply VDD3. The data circuitry 806 may be an example of the data circuitry 118, described with reference to FIG. 1. The termination load circuit 206 may be configured to receive power from a bias power supply VDD1.

The AC-coupled communications interface circuitry 800 is similar to the DC-coupled communications interface circuitry 700 except that the source transmitter 220 may be AC-coupled with the data circuitry 806 via the signal transmission lines TXN and TXP, and the termination load circuit 206 may be integrated with the transmitter module 802.

FIG. 9 is a flowchart of an exemplary method for powering circuits for a communications interface. The communications interface may transmit video data over a transmission line from a communications transmitter module to a communications receiver module for display on a video display. In the method, circuitry associated with the communications transmitter module, such as transmitter module 302, may be powered using current drawn from a communications receiver module, such as the receiver module 304, over a transmission line, such as transmission line 104. By powering the circuitry associated with the communications transmitter module using current drawn from the communications receiver module, less power overall may be consumed by the communications transmitter module. The current drawn from the communications receiver module may need to be drawn at least for the purpose of biasing the transmission line and/or communications interface circuitry. Re-using the current drawn to at least partially power the transmitter module reduces an amount of additional power needed to power the transmitter module, and therefore, reduces overall power consumption.

In step 902, a transmission line is biased using biasing circuitry coupled with the transmission line. The biasing circuitry may be configured to draw current from a first power supply. The biasing circuitry may be configured to bias the transmission line at a preset nominal voltage. The biasing circuitry may also be configured to cause a preset nominal value of current to flow through the transmission line. The first power supply may also be used to power circuitry of the communications receiver module. The circuitry of the communications receiver module may also be coupled with the transmission line.

In step 904, current from the first power supply is sinked through biasing circuitry. Circuitry including a current regulator may be used to sink the current. The current regulator may be configured to regulate the current sinked from the first power supply through the biasing circuitry to be approximately constant. The circuitry used to sink the current may also include a voltage regulator configured to regulate voltage of a second power supply.

In step 906, a voltage of the second power supply is regulated to be approximately constant. The second power supply may include a voltage regulator configured to receive at least a portion of the current sinked in step 904 as well as regulate the voltage of the second power supply.

In step 908, at least a portion of the current sinked from the first power supply in step 904 is supplied to the circuitry associated with the communications transmitter module via the second power supply. The voltage regulator as described in step 906 may supply at least a portion of the current sinked in step 904 to circuitry associated with the communications transmitter module configured to be powered by the second power supply. The current supplied to the circuitry associated with the communications transmitter module may be used to power the communications transmitter module.

The circuitry associated with the communications transmitter module may be configured to be powered by a combination of power from the second power supply and a third power supply. For example, the circuitry associated with the communications transmitter module may require more power than the second power supply may be able to provide. By receiving power from a combination of the second power supply and the third power supply, the circuitry associated with the communications transmitter module may consume less power overall than if the third power supply alone powered the circuitry associated with the communications transmitter module.

Several embodiments are specifically illustrated and/or described herein. However, it will be appreciated that modifications and variations are covered by the above teachings and within the scope of the appended claims without departing from the spirit and intended scope thereof. For example, embodiments of the present invention may be used in other applications besides data communications systems to power an electronic circuit using current also used to bias a voltage node at approximately a specific voltage value. Embodiments of the present invention may be used to power integrated circuits (IC's), system on chips (SOC's), or chips on boards (COB's). Embodiments of the present invention may also be used to power an electronic circuit using current which is also used to produce a voltage drop across a circuit element, such as a resistor, coupled with another electronic circuit. In some embodiments, analog signals may be communicated over a transmission line between a transmitter and receiver in addition to or instead of digital data.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. An electronic circuit comprising:
    transmission line driver circuitry coupled with a transmission line, the transmission line coupled with a first power supply through an impedance;
    digital data circuitry coupled with the transmission line driver circuitry and configured to transmit data over the transmission line using the transmission line driver circuitry, the digital data circuitry configured to receive power from a second power supply;
    current regulator circuitry coupled with the transmission line driver circuitry and configured to regulate a current received from the first power supply through the transmission line driver circuitry to be approximately constant; and
    voltage regulator circuitry coupled with the current regulator circuitry and configured to provide the second power supply having an approximately constant voltage, the second power supply supplying current received from the first power supply through the current regulator circuitry to at least the digital data circuitry.

2. The electronic circuit of claim 1, wherein the digital data circuitry is configured to transmit data over the transmission line using a protocol selected from the group consisting of HDMI, DVI, and DisplayPort.

3. The electronic circuit of claim 1, wherein the transmission line driver circuitry is DC-coupled with receiver circuitry via the transmission line.

4. The electronic circuit of claim 3, wherein the receiver circuitry is configured to be powered by the first power supply.

5. The electronic circuit of claim 1, wherein the transmission line driver circuitry is AC-coupled with receiver circuitry via the transmission line.

6. The electronic circuit of claim 1, wherein the digital data circuitry is configured to be powered by a combination of the second power supply and a third power supply.

7. A system for data communications comprising:
 data communications transmitter circuitry configured to transmit data via a transmission line;
 biasing circuitry configured to bias the transmission line at a bias voltage by sinking current from a first power supply; and
 voltage regulator circuitry coupled with the biasing circuitry and configured to regulate an approximately constant voltage at a second power supply, the second power supply coupled with the data communications transmitter circuitry, the voltage regulator circuitry being further configured to supply current sinked by the biasing circuitry from the first power supply to the data communications transmitter circuitry via the second power supply.

8. The system of claim 7, wherein the transmission line and the first power supply are coupled with data communications receiver circuitry configured to receive data transmitted by the data communications transmitter circuitry.

9. The system of claim 8, wherein the data communications transmitter circuitry is DC-coupled with the data communications receiver circuitry via the transmission line.

10. The system of claim 8, wherein the data communications receiver circuitry is configured to be powered by the first power supply.

11. The system of claim 7, wherein the data communications transmitter circuitry is configured to transmit data using a differential signaling protocol.

12. The system of claim 7, wherein the data communications transmitter circuitry is configured to transmit video data for display on a video display.

13. The system of claim 7, wherein the data communications transmitter circuitry is configured to be powered by a combination of the second power supply and a third power supply.

14. A method for powering circuits for a communications interface comprising:
 biasing a transmission line using biasing circuitry coupled with the transmission line and configured to draw current from a first power supply;
 sinking the current from the first power supply through the biasing circuitry;
 regulating a voltage of a second power supply to be approximately constant, the second power supply configured to power circuitry for a communications interface; and
 supplying current sinked from the first power supply to the circuitry for the communications interface via the second power supply.

15. The method of claim 14, further comprising powering communications transmitter circuitry for the communications interface using the second power supply.

16. The method of claim 14, further comprising powering communications receiver circuitry coupled with the transmission line, the powering being performed by the first power supply.

17. The method of claim 14, further comprising transmitting video data over the transmission line to communications receiver circuitry for display on a video display.

18. The method of claim 14, further comprising regulating the current sinked from the first power supply through the biasing circuitry to be approximately constant.

19. The method of claim 14, further comprising powering communications transmitter circuitry for the communications interface using a combination of power from the second power supply and a third power supply.

* * * * *